(12) United States Patent
Schumann

(10) Patent No.: US 6,267,444 B1
(45) Date of Patent: Jul. 31, 2001

(54) BILATERALLY EFFECTIVE DRIVE MECHANISM

(75) Inventor: Peter Schumann, Untersiemau (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/424,012
(22) PCT Filed: May 12, 1998
(86) PCT No.: PCT/DE98/01357
§ 371 Date: Nov. 15, 1999
§ 102(e) Date: Nov. 15, 1999
(87) PCT Pub. No.: WO98/51529
PCT Pub. Date: Nov. 19, 1998

(30) Foreign Application Priority Data

May 13, 1997 (DE) .............................................. 197 20 860

(51) Int. Cl.$^7$ ...................................................... B60N 2/02
(52) U.S. Cl. ........................................... 297/374; 192/223
(58) Field of Search ............................... 297/374, 354.12, 297/361.1; 192/223

(56) References Cited

U.S. PATENT DOCUMENTS

| | | | |
|---|---|---|---|
| 3,110,380 | 11/1963 | Meyer et al. | 192/8 |
| 4,408,799 | 10/1983 | Bowman | 297/361 |
| 4,614,257 | 9/1986 | Harada et al. | 192/8 |
| 5,382,076 | 1/1995 | Scheck et al. | 297/354.12 |

FOREIGN PATENT DOCUMENTS

| | | |
|---|---|---|
| 36 08 858 | 10/1987 | (DE) . |
| 41 20 617 | 12/1992 | (DE) . |
| 43 09 334 | 9/1993 | (DE) . |
| 195 27 912 | 8/1996 | (DE) . |

Primary Examiner—Peter R. Brown
(74) Attorney, Agent, or Firm—Christie, Parker & Hale, LLP

(57) ABSTRACT

The present device relates to a two-way drive for producing a rotation movement. The drive has a return spring coupled with a return catch for the purpose of returning a drive lever to its zero position, and at least two friction locked components positioned on the shaft and linked to one another, whereby upon movement of the drive lever away from the zero position these friction locked components in association with an elastic switching component engage with the shaft and on the drive side transfer a torque to the shaft. The return catch (7, 7') is directly secured to one of the friction locked components (2, 3, 4; 2', 3'), whereby the return spring (6, 6') also serves as an elastic switching component. This provides a two-way drive for producing a rotation movement which is flat and compact and is characterised by few components.

14 Claims, 5 Drawing Sheets

BILATERALLY EFFECTIVE DRIVE MECHANISM

DESCRIPTION

Figure 1:
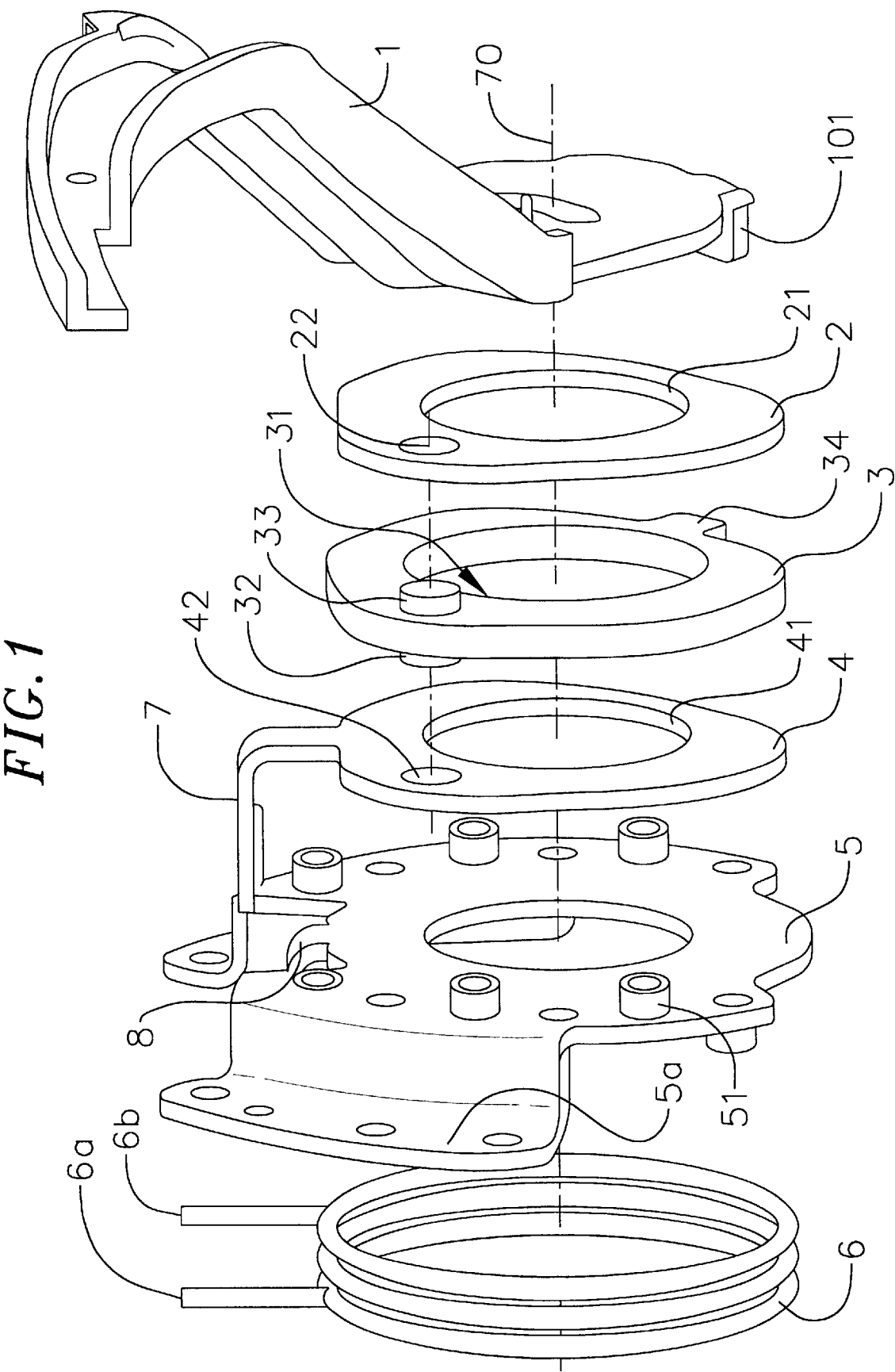

The invention relates to a two-way drive according to the introductory clause of claim 1. A drive of this nature is particularly suitable for use in a manual adjustment device for raising or inclining a vehicle seat.

DE 43 09 334 A1 disclosed a two-way drive whereby force is transferred from a drive lever to a shaft which is to be driven, whereby this force transfer takes place through friction locked components positioned on the shaft. Upon entering the drive phase, the friction locked components have friction-dependent self-locking with the upper surface of the shaft which is to be driven. It is thereby ensured that the friction torque increases dependent upon the drive torque, whereby great forces can also be transferred. Upon reverse movement of the drive lever in the direction of its zero position, however, the self-locking is released and the friction torque is kept as low as possible.

The conditions for self-locking are controlled by an elastic switching component. If the drive lever swings over its zero position, this leads to expansion of the elastic switching component which is formed in particular as a wire-form spring. The tangentially working force thereby produced gives rise to tilting and tensioning processes within the clearance area of the drive mechanism, in such a way that self-locking can come into effect and be increased.

When the drive lever returns to the zero position, one spring end of the elastic switching component exerts a tangential force on the friction locked components by means of a bolt, whereby this tangential force works in the swing direction of the drive lever and releases the self-locking properties in such a way that the shaft is prevented from clamping or turning backwards.

Two-way drives of the nature described in DE 43 09 334 A1 generally have—in addition to the components described there—a return spring for returning the drive lever to its zero position. The return spring is thereby supported on the one hand on a fixed casing catch and on the other hand it is coupled with a return catch which is directly secured to the drive lever. A return spring of this nature is for example described in DE 195 27 912 A1.

Existing two-way drives of the afore-mentioned nature thus have two spring components—a spring component for returning the drive lever to its zero position and a spring component (elastic switching component) for engaging the friction locked components with the shaft.

On the basis of this existing technology, it is an object of the present invention to create a two-way drive for producing a rotation movement, whereby this drive is flat and compact and is characterised by few components.

The solution according to the invention provides that the return catch which is coupled with the return spring is secured to one of the friction locked components. The return spring thereby serves as an elastic switching component. In other words, when the drive lever moves away from the zero position, the return spring causes the friction locked components to engage with the shaft. At the same time, the return spring is used for returning the drive lever to its zero position, whereby the friction locked component connected to the return catch itself has a friction locked and/or a shape locked connection with the drive lever, in such a way that a restoring force is transferred through the friction locked component to the drive lever.

According to the invention, the return catch is secured to one of the friction locked components, which means that the return spring performs a dual function. Besides the restoring function, it also performs the function which in the current state of technology has been performed by a specially provided elastic switching component. This function consists in bringing about self-locking of the friction locked components with the upper surface of the shaft which is to be driven, when the drive lever moves away from the zero position. There is thus no need for a separate elastic switching component to perform the latter function.

The omission of a separate elastic switching component means that all in all the drive can be flatter and more compact. The space requirement is reduced. By reducing the components, the tolerance chain, i.e. the sum of the maximum tolerances between the individual components, is also reduced. This means that the clearance area of the drive lever is reduced.

Reference is made to the fact that the use of the clamping principle disclosed in DE 43 09 334 A1 is unchanged in the present invention. With regard to the corresponding configuration of the individual friction locked components and the way in which they are linked together, reference is made to this document in this respect.

In a preferred embodiment of the invention, the return spring is positioned on the output side on a brake box. The brake box contains a brake mechanism, which is connected to the shaft in such a way that a torque transfer on the output side is blocked, whereas a torque transfer on the drive side releases the blocking effect. A blocking mechanism of this nature is for example described in DE 41 20 617 A1.

Between the friction locked components positioned on the shaft axis and the brake box there is preferably a mounting support, by means of which the two-way drive can be secured to a support component, for example a vehicle seat. The fixed casing catch which is connected to the return spring is thereby preferably secured to/formed on the brake box or the mounting support. The casing catch thereby forms a fixed position upon which the spring supports itself.

The return spring is preferably constituted by a coil-like torsion spring or a wire-form spring with two free ends which are connected to the casing catch/the return catch. Springs of this nature allow a tangentially working force to be simply produced. In addition, the components are relatively easy to manufacture and cost-effective.

The return catch is advantageously formed as a plate, which is formed on the corresponding friction locked component, extends from this friction locked component to the restoring spring and is connected to one free end of the restoring spring. The friction locked component equipped with the return catch is thereby preferably formed as a component which is stamped and bent. This facilitates cost-effective manufacture of the friction locked component, whereby the return catch is manufactured in a straightforward way by stamping and bending.

In a preferred embodiment of the invention, a total of three friction locked components are provided. They are positioned on the shaft axis and for the purpose of engaging with the shaft they are linked to one another, as for example described in DE 43 09 334 A1.

In a preferred configuration of this embodiment of the invention, the middle friction locked component is formed as a sinter component and the two side-positioned friction locked components are formed as sheet metal components. The sinter component is thereby equipped with bolts which engage corresponding bores of the two side-positioned friction locked components, and provide a link between the middle friction locked component and the respective side-positioned friction locked components. When the drive lever is activated from its zero position, the side-positioned friction locked components tilt in relation to the middle friction locked component, whereby they clamp the shaft which is to be driven.

The respective friction locked components are preferably in ring form and have inner force application areas, which can engage with the cylindrical contour of the shaft. Reference is again made to DE 43 09 334 A1 in this respect.

If the friction locked components are manufactured from sheet metal, for the purpose of linking the individual friction locked components together, the latter are preferably equipped with components which are put through, plates and/or embossed components. Friction locked components of this nature can be manufactured simply and cost-effectively and they allow the individual friction locked components to be linked together in a straightforward way.

The invention will now be explained in greater detail by reference to several embodiments as illustrated.

The drawings show

Figure 2:
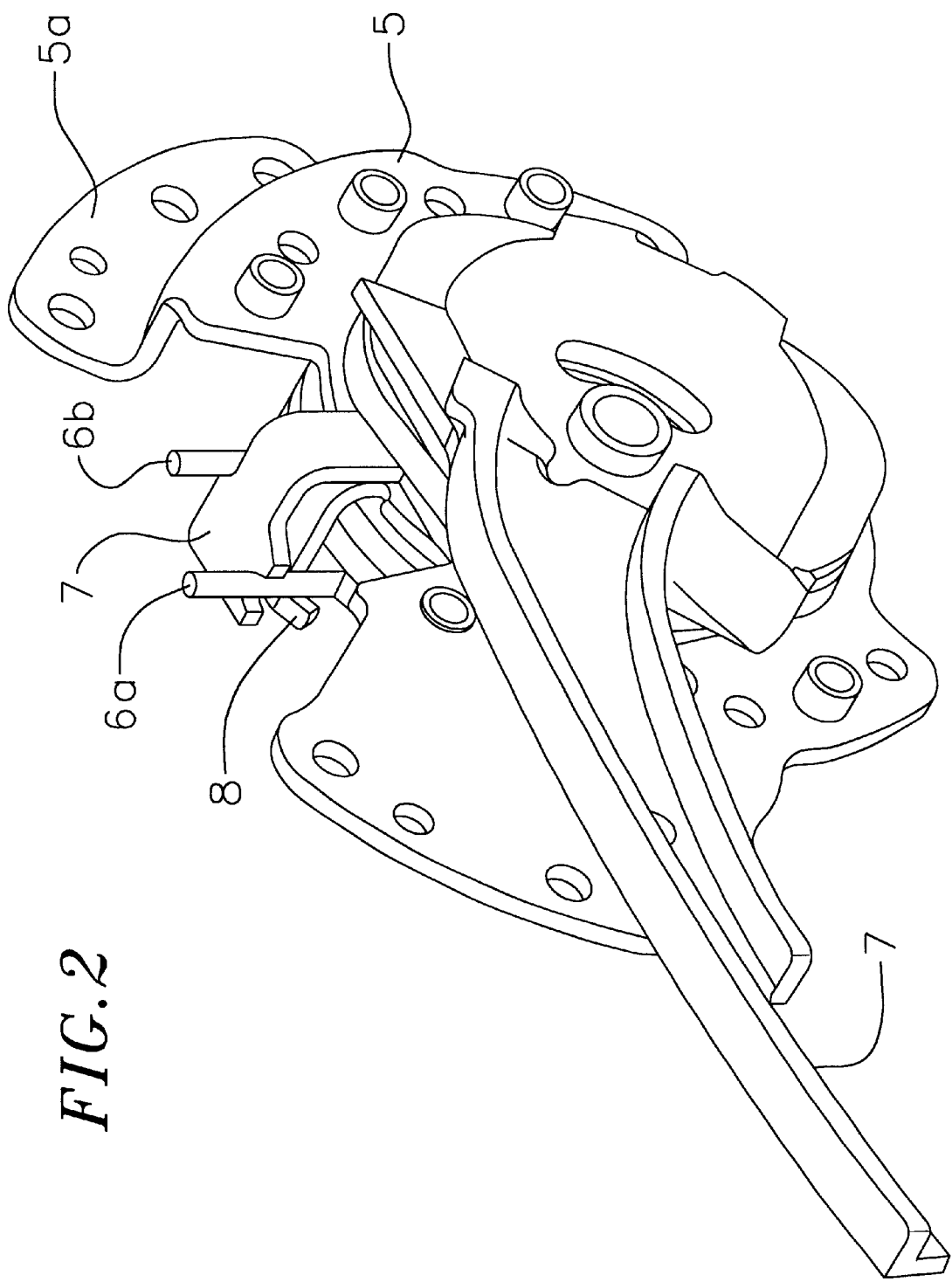

FIG. 1 schematic exploded view of a two-way drive according to the invention with three friction locked components FIG. 2 perspective view of the drive according to FIG. 1

Figure 3:
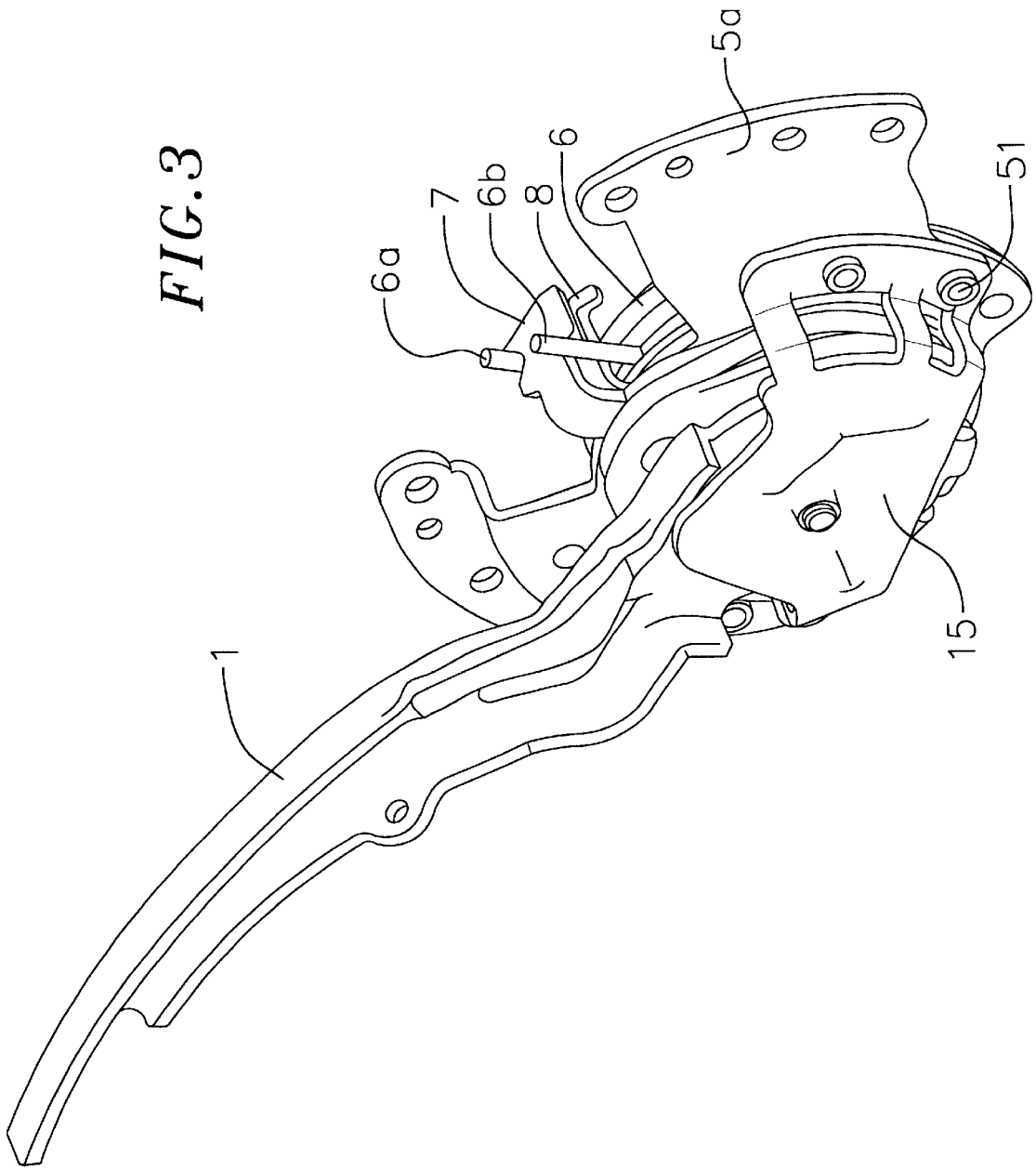
Figure 4:
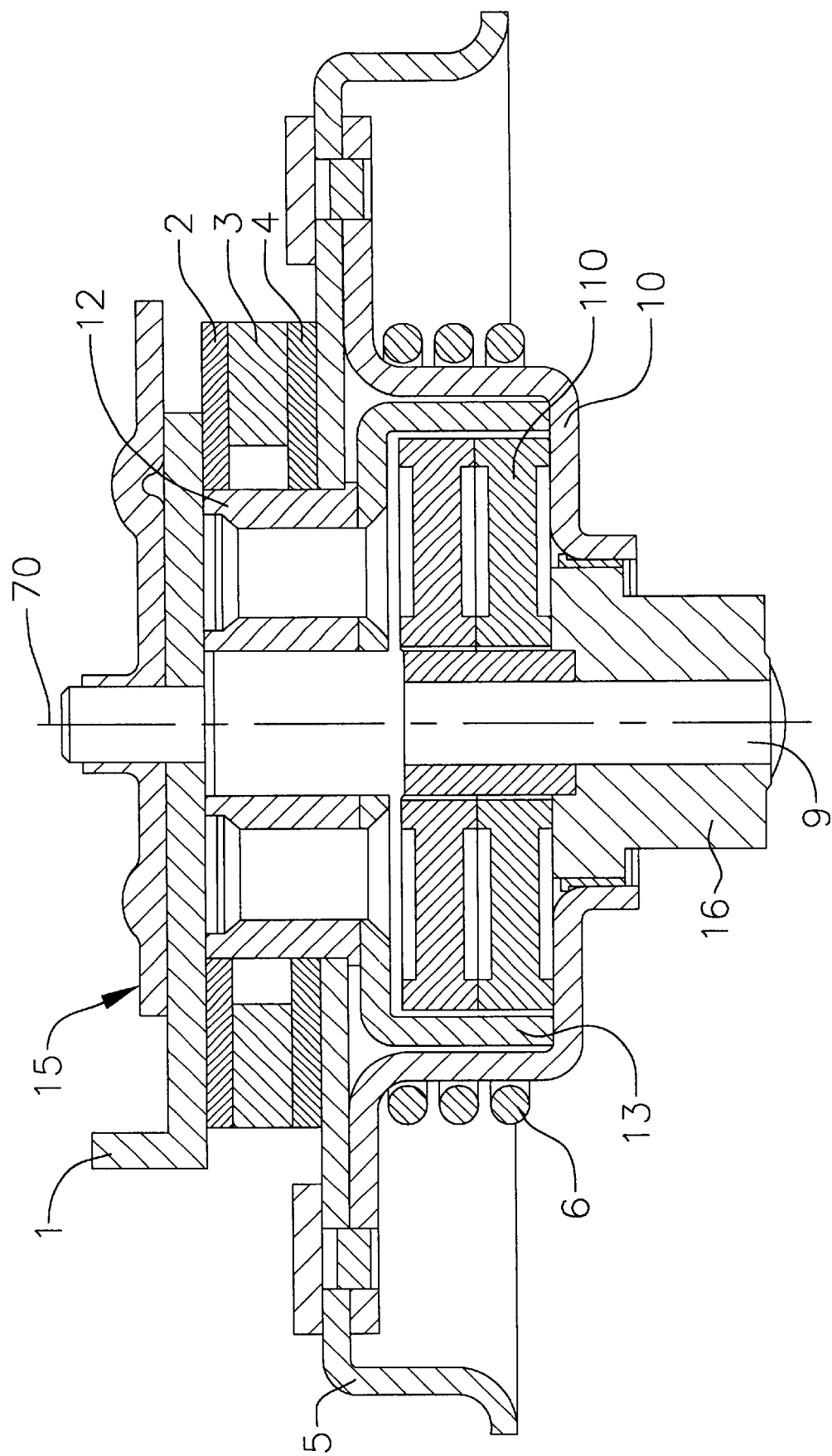
Figure 5:
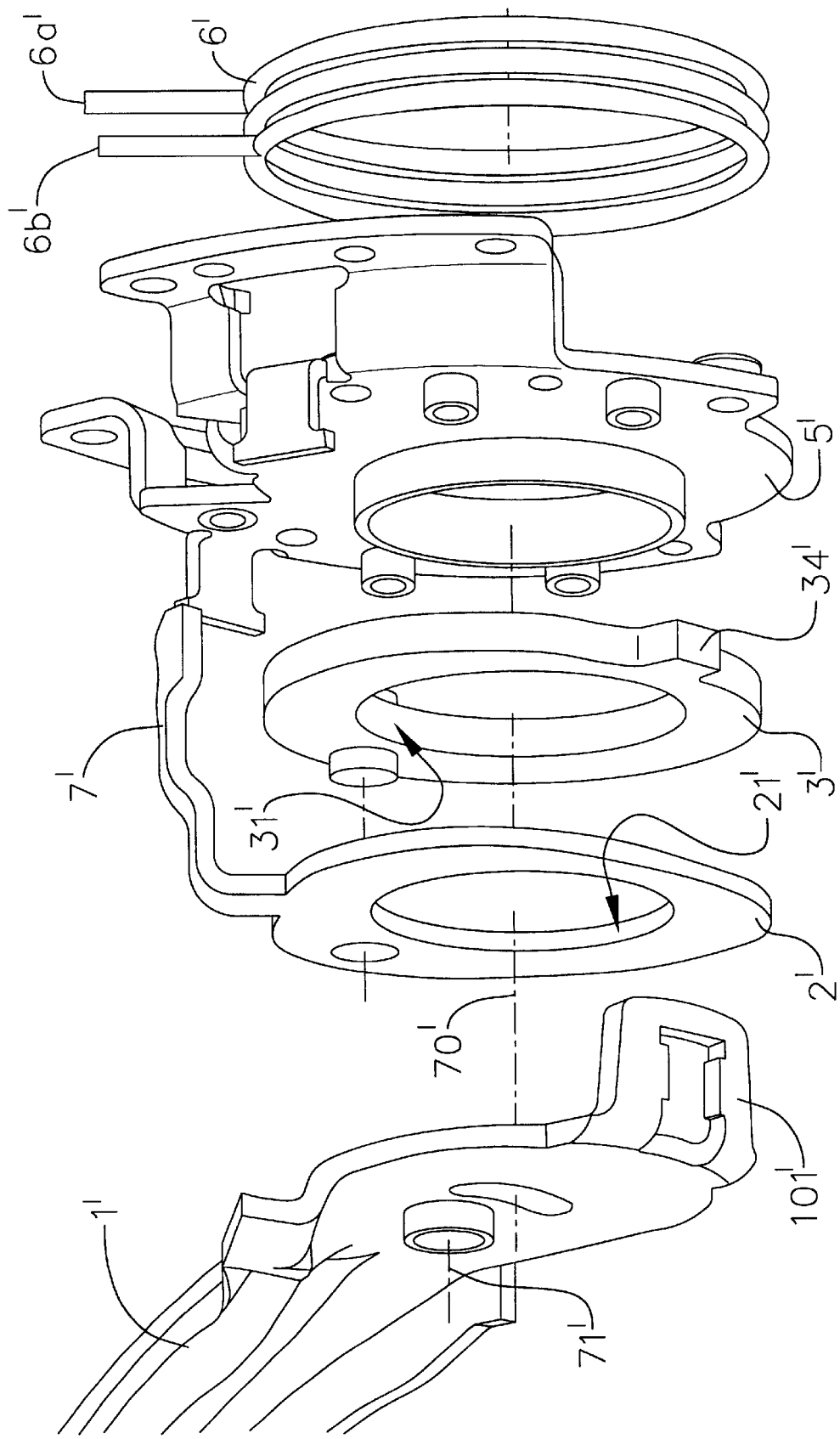

FIG. 3 further perspective view of the drive according to FIG. 1, whereby a cover plate is secured to the mounting plate in order to support the drive lever FIG. 4 transverse section of a drive according to the invention FIG. 5 exploded view of a two-way drive according to the invention with two friction locked components.

The two-way drive shown in FIGS. 1 to 3 has a drive lever 1, three ring-shaped friction locked components 2, 3, 4, a mounting support 5 and a return spring 6 with two free ends 6a, 6b. All the afore-mentioned components are positioned on an axis 70, on which the shaft which is not illustrated turns.

The friction locked components 2, 3, 4 each have force application surfaces 21, 31, 41 which can engage with the cylindrical contour of the shaft which is not illustrated. The force application surfaces 21, 41 of the friction locked components 2, 4 are positioned diametrically to the force application surface 31 of the friction locked component 3. The friction locked component 3 is formed as a sintered component and has two bolts 32, 33, which engage corresponding bores 42, 22 of the friction locked components 4, 2. The friction locked components 2, 3, 4 are thereby linked together. The friction locked components 2, 4 are preferably stamped from sheet metal.

The drive lever 1 has a shape locked connection with the middle friction locked component 3. For this purpose, on the drive lever 1 there is a mounting plate 101 which extends in the direction of the middle friction locked component 3 and engages a catch 34 there. A configuration of this nature can be seen particularly well in the embodiment of the invention according to FIG. 5, to which reference is made in this respect.

The friction locked component 4 which lies closest to the mounting support 5 forms a return catch or return plate 7 (which can also be referred to as a tension bolt or a tension catch). The return plate 7 extends beyond the mounting support 5 to one lateral side 6a of the restoring spring 6 and lies on the inner side thereof. On the mounting support 5 there is a further plate, a casing plate 8 which engages the other free end 6b of the restoring spring 6. As is shown in FIG. 2, the two plates 7, 8 are clamped between the two free ends 6a, 6b of the restoring spring 6.

The mounting support 5 is secured by means of mounting surfaces 5a to a fixed support component, for example the side part of a vehicle seat. Furthermore, on the mounting support 5 there are tubes 51 for attaching a cover plate 15 as shown in FIG. 3. The cover plate 15 thereby covers the area of the drive lever 1 positioned around the shaft which is to be driven and it also covers the friction locked components 2, 3, 4.

The drawing in FIG. 1 simply shows the essential components of the two-way adjustment drive according to the present invention. There are possibly further components such as distance tubes or spacer discs. In particular there is a brake box which is not shown in FIG. 1 and is not recognisable from FIGS. 2 and 3, and there is a brake mechanism positioned in this brake box. The brake mechanism is connected to the shaft in such a way that a torque transfer on the output side is blocked, whereas when there is a torque transfer on the drive side the blocking effect is released. The brake mechanism thus prevents an adjustment of the drive occurring if there are external forces. In particular the brake mechanism ensures that if there are crash forces, a rotation movement of the shaft is prevented. The restoring spring 6 is preferably positioned on the external area of the brake box which is not illustrated.

If the drive lever 1 swings away from the zero position, the friction locked component 3 is also tilted due to the connection 101 of the drive lever 1 with the catch 34 of the friction locked element 3. Due to the link 32, 42, the rotation of the friction locked component 3 is transferred to the friction locked component 4. By means of the return plate 7 of the friction locked component 4, the rotation movement is further transferred to the restoring spring 6, and indeed to the free end 6a which is connected to the return plate 7. The free end 6b supports itself on the casing plate 8.

When the free end 6a is displaced, the restoring spring 6 is tensioned. A tangential force thereby acts on the return plate 7, which causes a tilting movement of the friction locked component 4 in relation to the friction locked component 3. Accordingly, the friction locked component 2 is also tilted in relation to the middle friction locked component 3. The respective force application areas 41, 31, 21 of the friction locked components 4, 3, 2 thereby engage with the upper surface of the shaft, whereby the shaft is clamped by means of the friction locked components 2, 3, 4/their force application areas 21, 31, 41, and friction-dependent self-locking occurs. In this way the torque of the drive lever 1 is transferred to the shaft.

When the drive lever 1 is released, it is automatically returned to the zero position by means of the return spring 6. The restoring force of the spring 6 is thereby transferred through the free end 6a of the spring to the return plate 7 and thus the friction locked component 4, and from here it is transferred to the drive lever 1.

The restoring force is transferred from the friction locked component 4 to the drive lever 1 through the middle friction locked component 3 by means of the link 42, 32 and by means of the connection 34, 101 between the friction locked component 3 and the drive lever 1. At the same time, however, the friction locked components 2, 3, 4 lying on one another and the drive lever 1 are also coupled with each other through frictional force, in order to provide protection from rattling.

When the drive lever 1 is returned to the zero position, the self-locking between the friction locked components 2, 3, 4 and the shaft is released, as due to the restoring movement of the restoring spring 6 there is no further tilting of the friction locked component 4 through the return plate 7.

FIG. 4 shows a section through a two-way drive according to the invention, whereby the illustrated drive corresponds essentially to the drive illustrated in FIGS. 1 to 3. In addition to the components illustrated therein, namely drive lever 1, cover plate 15, friction locked components 2, 3, 4, mounting support 5 and restoring spring 6, FIG. 4 also shows a progressive bolt 9, the drive shaft 12, a brake container 10 and clamping jaws 110 of a brake mechanism positioned in the brake container 10. The friction locked components 2, 3, 4 are positioned on the shaft 12 and when the drive lever 1 swings away from the zero position, the friction locked components 2, 3, 4 clamp with the shaft 12. The drive shaft 12 is thereby coupled with a drive pinion 16 by means of claws 13 and wings which are only partly illustrated. The drive shaft 12 is positioned on the progressive bolt 9, but it is not connected thereto in a rotation-secure way.

FIG. 5 shows an alternative embodiment of a two-way drive according to the invention, which works with two friction locked components 2', 3'. The friction locked component 2' which is facing the drive lever 1' is connected to a return spring 6' by means of a return plate 7'. The other friction locked component 3' is connected to a mounting plate 101' of the drive lever 1' by means of a catch 34'. As in the previous description relating to FIGS. 1 to 3, when the drive lever 1' swings away from the zero position the tangential force exerted on the friction locked component 2' by means of the restoring spring 6' and the return plate 7' results in a tilting of the friction locked components 2', 3', whereby the respective force application areas 21', 31' clamp with the shaft through self-locking, and thereby allow force to be transferred to the shaft.

At the same time, the restoring spring 6' is used to automatically return the drive lever 1' to the zero position, whereby a transfer of force from the restoring spring 6' to the drive lever 1' occurs through the return plate 7' and the friction locked component 2'. Also, the restoring force is transferred in a shape locked way from the friction locked component 2' to the friction locked component 3', and from the catch 34' of the friction locked component 3' to the drive lever 1' by means of the mounting plate 101'.

In the embodiment of the invention according to FIG. 5, the drive lever 1' has a swivel axis 71 positioned facing the axis 70' of the drive shaft. This results in a favourable transformation ratio, in such a way that with a low number of strokes a certain traverse can be achieved.

The embodiments of the invention are not restricted to the afore-mentioned examples. In particular, any other configurations of friction locked components can be used which in association with the restoring spring allow a transfer of the rotation movement from the drive lever to the shaft whereby there is friction-dependent self-locking, when the drive lever swings away from the zero position.

Further configurations of friction locked components of this nature are for example described in DE 43 09 334 A1. An essential characteristic of the invention is solely the fact that the return plate is secured to one of the friction locked components in such a way that the return spring—besides its function of returning the drive lever to its zero position—also fulfils a further function as an elastic switching component when the drive lever swings out of its zero position, and in association with the friction locked components gives rise to friction-dependent self-locking of the friction locked components in relation to the shaft.

What is claimed is:

1. A two-way drive for producing a rotation movement of a shaft comprising:

a drive lever having a first drive direction away from a zero position and a second drive direction opposite the first drive direction away from the zero position;

a return spring for returning the drive lever to its zero position;

a fixed casing catch coupled to the return spring; and a return catch coupled to the drive lever;

at least two friction locked components positionable on the shaft and coupled to one another, wherein the friction locked components are connected to the drive lever in at least one of a friction locked way and a shape locked way;

wherein, upon movement of the drive lever away from a zero position, in association with the return spring which acts as an elastic switching component, the friction locked components are engageable with the shaft and on a drive side transfer a torque to the shaft, wherein the return catch is directly secured to one of the friction locked components; and wherein the shaft that is to be driven is only rotated when the drive lever moves away from the zero position, whereas when the drive lever moves in the direction of the zero position the shaft is not moved.

2. A two-way drive according to claim 1 further comprising a brake box, wherein the return spring is positioned on an output side on the brake box containing a brake mechanism, which is connectable to the shaft in such a way that torque transfer on the output side is blocked, whereas torque transfer on a drive side is possible.

3. A two-way drive according to claim 1 or claim 2 further comprising a mounting support between the friction locked components positioned on the shaft and the brake box whereby the two-way drive is secured to a support component.

4. A two-way drive according to claim 1 wherein the casing catch coupled to the return spring is secured to or formed on at least one of the brake box and the mounting support.

5. A two-way drive according to claim 1 wherein the return spring is formed as a screw-form restoring spring with two free ends, which are coupled to the casing catch and the return catch.

6. A two-way drive according to claim 1 wherein the return catch is formed as a plate on the corresponding friction locked component and which extends from the friction locked component to the restoring spring.

7. A two-way drive according to claim 1 wherein the friction locked component coupled to the return catch is formed as a component which is stamped and bent.

8. A two-way drive according to claim 1 further comprising three friction locked components which are positioned on the shaft and coupled to one another.

9. A two-way drive according to claim 8 wherein the middle friction locked component is formed as a sinter component and the two side-positioned friction locked components coupled to the middle friction locked component are formed as sheet metal components.

10. A two-way drive according to claim 1 wherein the friction locked components are ring-formed and have inner force application areas which are engageable with the cylindrical contour of the shaft.

11. A two-way drive according to claim 1 wherein the individual friction locked components are linked together by bolts and bores.

12. A two-way drive according to claim 1 wherein the individual friction locked components are sheet metal and for the purpose of coupling them together are equipped with at least one of components which are put through plates and components that are embossed.

13. A vehicle seat assembly comprising:
   a vehicle seat having a shaft; and
   a two-way drive for producing a rotation movement comprising:
   a drive lever having a first drive direction away from a zero position and a second drive direction opposite the first drive direction away from the zero position;
   a return spring for returning the drive lever to its zero position;
   a fixed casing catch coupled to the return spring; and
   a return catch coupled to the drive lever,
   at least two friction locked components positioned on the shaft and coupled to one another, wherein the friction locked components are connected to the drive lever in at least one of a friction locked way and a shape locked way;
   wherein upon movement of the drive lever away from a zero position, in association with the return spring which acts as an elastic switching component, the friction locked components engage with the shaft and on a drive side transfer a torque to the shaft,
   wherein the return catch is directly secured to one of the friction locked components; and
   wherein the shaft that is to be driven is only rotated when the drive lever moves away from the zero position, whereas when the drive lever moves in the direction of the zero position the shaft is not moved.

14. A vehicle seat according to claim 13 further comprising:
   a brake box having a brake mechanism, which is connected to the shaft in such a way that torque transfer on the output side is blocked, whereas torque transfer on the drive is possible;
   a mounting support between the friction locked components positioned on the shaft and the brake box; whereby the two-way drive is secured to the vehicle seat.

* * * * *